INVENTORS:
Richard Beckadolph
Walter Niclas

Dec. 17, 1963  R. BECKADOLPH ETAL  3,114,598
METHOD OF MAKING A PRECISION TRANSMISSION
BELT WITH MESHING TEETH
Filed Dec. 29, 1959  3 Sheets-Sheet 2

INVENTORS:
Richard Beckadolph
Walter Niclas

Dec. 17, 1963    R. BECKADOLPH ETAL    3,114,598
METHOD OF MAKING A PRECISION TRANSMISSION
BELT WITH MESHING TEETH
Filed Dec. 29, 1959    3 Sheets-Sheet 3

INVENTORS:
Richard Beckadolph
Walter Niclas

United States Patent Office 3,114,598
Patented Dec. 17, 1963

3,114,598
METHOD OF MAKING A PRECISION TRANSMISSION BELT WITH MESHING TEETH
Richard Beckadolph, Grasdorf uber Hannover, and Walter Niclas, Altwarmbuchen uber Hannover, Germany, assignors to Continental Gummi-Werke Aktiengesellschaft, Hannover, Germany
Filed Dec. 29, 1959, Ser. No. 862,714
Claims priority, application Germany Oct. 9, 1952
5 Claims. (Cl. 18—59)

The present invention relates to a method of making a precision transmission belt with meshing teeth, especially a higher speed belt, and is a continuation-in-part application of our copending application Ser. No. 369,272, filed July 21, 1953, and now abandoned.

It is known to provide a precision transmission belt, for instance a transmission belt for sewing machine units, with reinforcing wires. However, the heretofore known methods of producing such precision transmission belts have been too complicated and, consequently, the heretofore known belts of the type involved were too expensive, aside from the fact that also the quality of such belts did not always come up to the required standards.

It is, therefore, an object of the present invention to provide a method of making a precision transmission belt, which will overcome the above mentioned drawbacks.

It is another object of this invention to provide a method of making a precision transmission belt, which can be carried out in a simple manner and in a minimum of time and will result in an endless high precision transmission belt.

A still further object of this invention consists in the provision of a method of making a belt of the type set forth in the preceding paragraphs, which will make it possible in a simple and reliable manner properly to locate the wire inserts in the belt and will assure that no dislocation of said wire inserts will occur during the manufacture of the belt.

These and other objects and advantages of the invention will appear more clearly from the following specification in connection with the accompanying drawings, in which.

The method of making a transmission belt according to the present invention is characterized primarily in that it is cast of elastic synthetic material, preferably of material selected from the group consisting of polyurethanes and polyamides, and that the reinforcement in form of a wire or the like, which limits the expansion of the belt, is wound over fixed abutments in the mold and is held thereby until the synthetic material cast in liquid condition has solidified. The reinforcement in form of a wire is spirally wound around a mandrel or the like forming part of the mold, while said spirals are substantially uniformly spaced over the width of the supports therefor.

Figure 1:
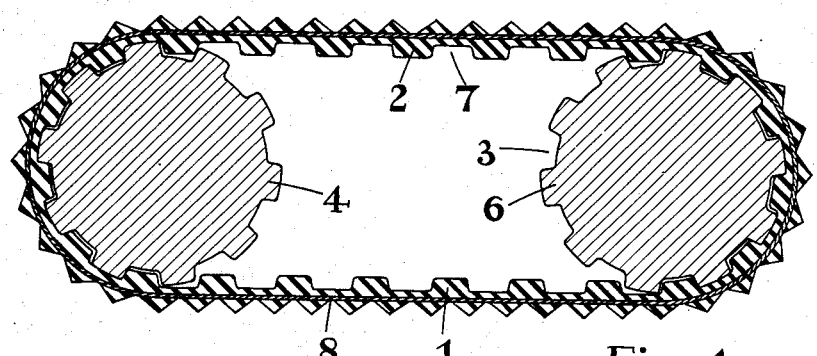
FIG. 1 is a section through a precision transmission belt made according to the present invention and shown in connection with the pulleys meshing therewith.
Figure 2:
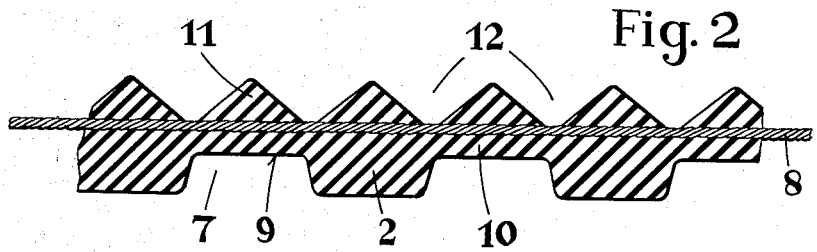
FIG. 2 is a longitudinal section through a portion of the belt according to FIG. 1 but on a scale considerably enlarged over that of FIG. 1.

Referring now to the drawings in details, and FIGS. 1 and 2 thereof in particular, FIG. 1 shows a belt made according to the present invention and generally designated with the reference numeral 1. This belt is provided with precision teeth 2 which mesh with tooth spaces 3 of pulleys 4 and 5, while the teeth 6 of said pulleys mesh with corresponding tooth spaces 7 of belt 1.

Figure 3:
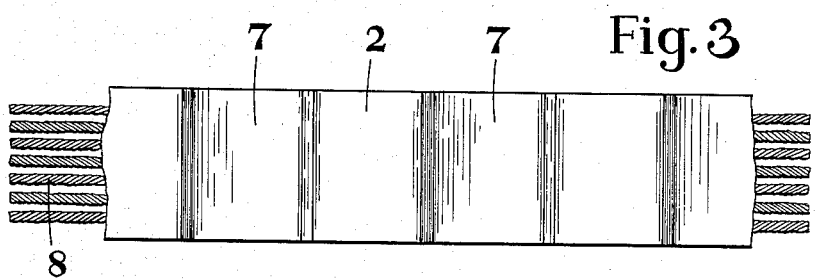
FIG. 3 is a portion of a bottom view of the belt shown in FIG. 1 but on a larger scale than that of FIG. 1.

As will be evident from FIGS. 1 and 2, belt 1 is provided with reinforcing means in form of a wire 8 which is spirally wound throughout the length of the entire belt so that the individual windings are spaced from each other in transverse direction of the belt (see FIG. 3). Inasmuch as it is well known in the art spirally to wind wire inserts for belts, a corresponding showing has been considered superfluous.

As will be evident from FIGS. 1 and 2, the wire 8 is spaced from the dedendum line 9 by a layer 10. The thickness of the layer 10 may vary in conformity with the thickness of the belt. Merely as an example and without any restriction, with a belt having a thickness of 1 millimeter at its thinnest portion and having a wire insert of 0.3 millimeter in diameter, the layer 10 may have a thickness of 0.7 millimeter.

It will furthermore be seen that the wire 8 is alternately covered by elevations 11 and exposed toward the outside of the belt at 12 to such an extent that the wire can actually be felt when passing the nail of a finger along the gap between each two adjacent elevations 11.

Figure 4:
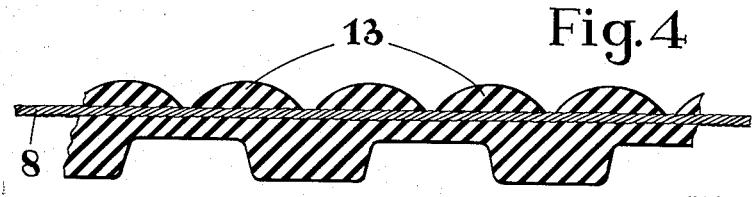
FIG. 4 is a longitudinal section through a portion of a belt made according to the invention but somewhat modified over the belt of FIG. 2.

While according to FIG. 2 the elevations 11 are of a triangular cross section, it is, of course, to be understood that these elevations which anchor the reinforcing wire to the back of the belt may also be of different cross section. Thus, the anchoring parts 13 of the modification shown in FIG. 4 are of a segmental shape.

Figure 5:
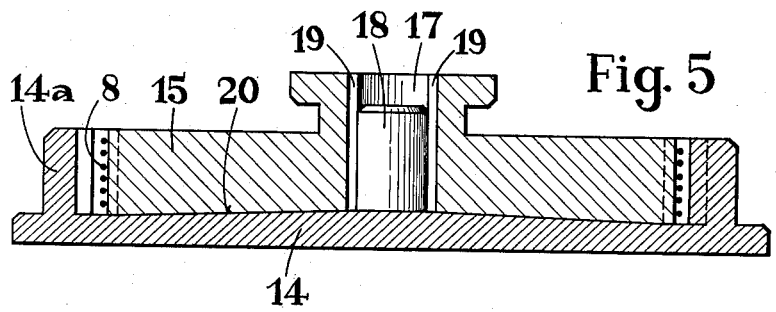
FIG. 5 is a mold for use in connection with the method of the present invention.
Figure 6:
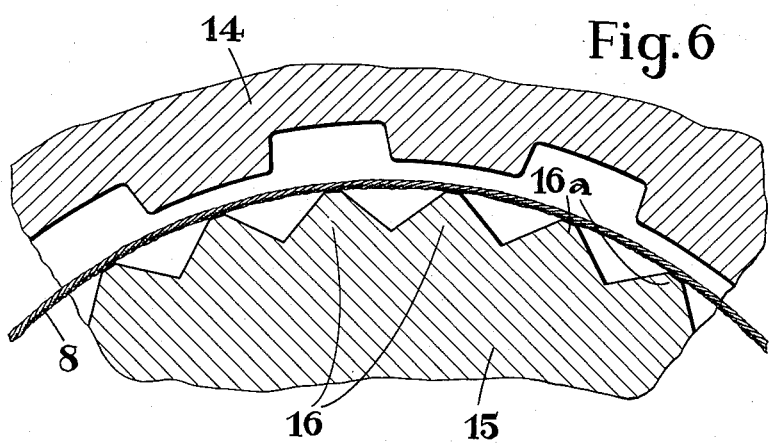
FIG. 6 shows a portion of the mold of FIG. 5 for producing the belt shown in FIGS. 1 and 2.

The belt shown in FIGS. 1 to 4 consists of a pourable or castable material, preferably of a material selected from the group consisting of polyurethanes and polyamides, and can easily be produced in a relatively inexpensive manner by the mold shown in FIG. 5. This mold comprises an outer portion 14 and an inner portion 15. The inner contour of the outer portion 14 corresponds to the contour of the teeth of the belt to be made as is particularly clearly shown in FIG. 6 for a belt shown in FIGS. 1 and 2. As will be clearly evident from FIG. 6, the portions 16a of the elevations 16 serve as supporting means for the wire when the latter is tightly wound around the inner portion or mandrel 15 of the mold.

The outer portion 14 of the mold with its annular flange-like portion 14a has centrally connected thereto a guide member 17 which receives a bore 18 of the inner mold portion 15. The said bore 18 is furthermore provided with venting grooves 19. The bottom of the outer mold portion 14 has an inclined surface 20, while the bottom surface of the inner mold portion 15 is inclined accordingly.

For purposes of carrying out the method according to the present invention in order to produce a belt, for instance of the type shown in FIGS. 1 to 3, the inner mold portion 15 (FIG. 5) is first removed from the outer mold portion 14. Assuming that a belt is to be made of the contour of the belt shown in FIGS. 1 to 3, the wire 8 is tightly wound in uniformly spaced spirals around the elevations 16 of the inner mold member 15 as shown in part in FIG. 6. It will be seen from FIG. 6 that the tips of the elevations 16 support the wire spirals 8. After the wire spirals 8 have thus been firmly tied around the inner mold member 15, the mold material of which the belt is to be made is poured into the outer mold portion 14 but only up to a certain level. Thereupon, the inner mold portion 15 is inserted into the outer mold portion so that the inner mold portion displaces the poured-in material which latter will then move into the space between the outer periphery of the inner mold portion and the inner periphery of the outer mold portion while air bubbles will escape through the venting grooves 19.

It is, of course, to be understood that the quantity of material initially poured into the outer mold portion 14 prior to the insertion of the inner mold portion 15 should be such that the excess material displaced from the mold when inserting the inner mold portion into the outer mold portion will be held at a minimum. It will also be evident, in particular from FIG. 6, that the liquid material in the mold can flow around the wire inserts on all sides except where said wire spirals are in direct supporting contact with the tips of the elevations 16. These last mentioned portions are the wire portions which when the belt is completed, will be exposed to the outside thereof and therefore can be felt for instance by a finger nail. After the poured material has solidified, the inner mold is removed from the outer mold and the solidified belt is withdrawn.

As last step, the belt is turned inside out. Assuming that the mold at the inner and outer mold portions had the contour shown in FIG. 6, the completed belt will then have the appearance of the belt shown in FIGS. 1 and 2.

Figure 7:
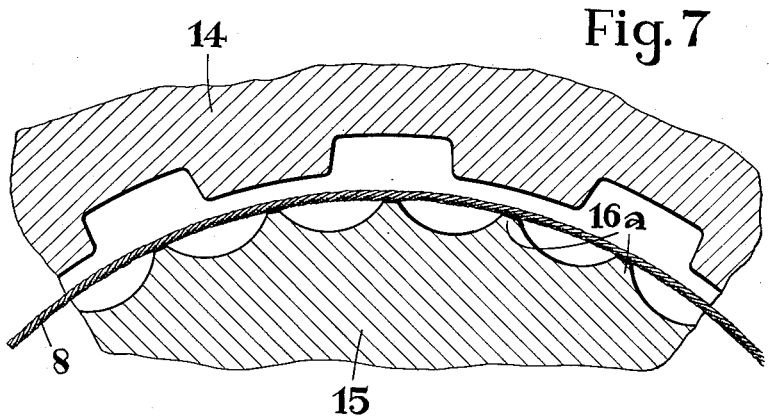
FIG. 7 shows a portion of a slight modification of the mold of FIG. 5 for producing the belt shown in FIG. 4.

The belt made according to FIG. 4 is made in conformity with the same method as just described. In this instance, however, the contour of the periphery of the inner mold portion will, of course, be slightly different, namely as shown in FIG. 7, so that the elevations will conform with the anchoring parts 13 as shown in FIG. 4.

Figure 8:
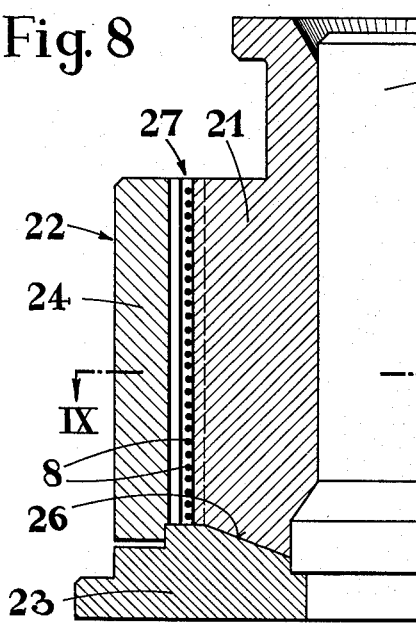
FIG. 8 is a section through a portion of a mold somewhat modified over the mold of FIG. 5 for producing a belt in conformity with the present invention.
Figure 9:
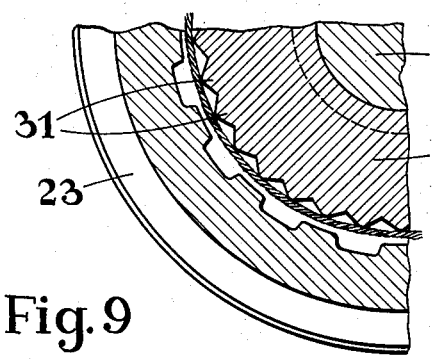
FIG. 9 is a section along the line IX—IX of FIG. 8.

FIGS. 8 and 9 illustrate a modification of the mold shown in FIG. 5. As will be seen from FIGS. 8 and 9, the inner and outer mold portions 21 and 22 are relatively higher with regard to their outer diameters than is the case with the mold of FIG. 5. Furthermore, the outer mold portion 22 consists of a bottom portion 23 having connected thereto, for instance by bolts (not shown in the drawings), an annular portion 24 the inner contour of which corresponds to the teeth of the belt to be made, in this instance the belt of FIG. 1. The inner mold portion 21 has a peripheral contour corresponding to that of the inner mold portion 15, i.e. corresponding to the contour of the anchoring portions or elevations 11. The bottom portion 23 of the mold of FIGS. 8 and 9 has likewise a central guiding bolt 25 connected thereto for receiving the inner mold portion 21. The top surface 26 of the bottom portion 23 is likewise inclined but in a direction opposite to the direction of inclination of the top surface 20 of the mold of FIG. 5.

The use of the mold of FIGS. 8 and 9 is substantially the same as that described in connection with FIG. 5. However, any air bubbles in the mold or in the material in the mold will in the case of the mold of FIG. 8 escape at 27.

Figure 10:
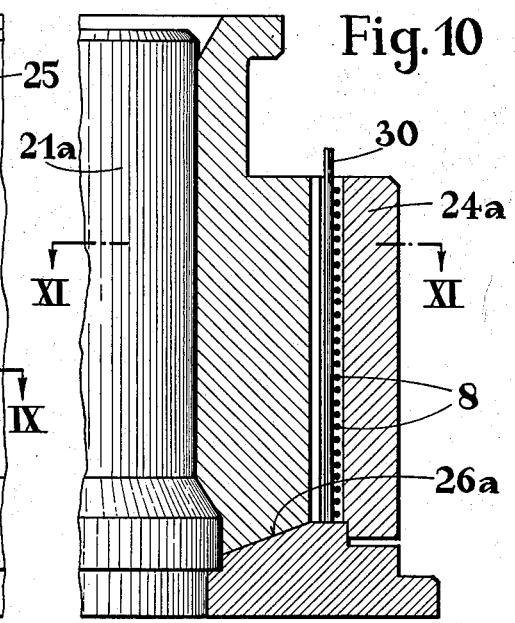
FIG. 10 is a section through a portion of a modified mold for use in connection with the method of the present invention.
Figure 11:
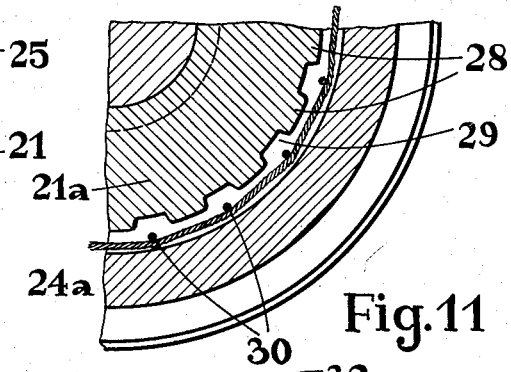
FIG. 11 is a section along the line XI—XI of FIG. 10.
Figure 12:
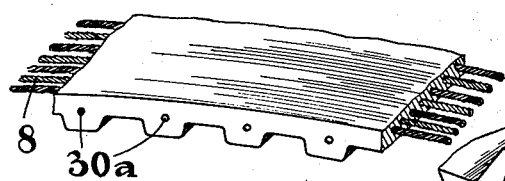
FIG. 12 is a perspective view of a portion of a belt made according to the method of the present invention by employing the mold of FIGS. 10 and 11.

The mold of FIGS. 10 and 11 corresponds substantially to that of FIGS. 8 and 9 and, accordingly, corresponding elements have been designated with the same reference numerals as in FIGS. 8 and 9 but with the affix a. The only difference of the mold of FIGS. 10 and 11 over the mold of FIGS. 8 and 9 consists in that the tooth spaces 29 and teeth 28 are located on the outer periphery of the inner mold member 21a, while at the same time pins 30 or similar supporting means extend through the inner mold member and while being supported by the outer mold member serve as supports for the windings of the wire insert 8. In other words, the windings of the wire insert 8 are wound over said pins 30 as is clearly shown in FIG. 11. It will thus be evident that the pins 30 serve the same purpose as the tips 16a in the mold of FIG. 7, namely for supporting the windings of the wire insert 8. In this instance, there is an annular space between the wire windings and the inner periphery of the outer mold member 23a so that the back of the wire windings is completely covered by the material poured into the mold. From the above, it will be evident that when the material has solidified, and the mold has been taken apart, and the belt has been withdrawn from the mold, the belt will have the appearance as shown in FIG. 12 representing a portion of a belt made by means of a mold according to FIGS. 10 and 11. The belt may be withdrawn from the pins 30 as soon as the belt has solidified in the mold.

While in this instance, transverse bores remain in the belt, these transverse bores are by no means disadvantageous. They rather contribute to the flexibility of the belt.

It should be noted that the various molds shown in FIGS. 5 to 11 of the drawings will remain open until the respective inner mold portions have been fully inserted into their respective outer mold portions pertaining thereto. In other words, while during the insertion of the inner mold portion into the outer mold portion the inner mold portion exerts a slight displacing pressure upon the poured material between the bottom of said inner and outer mold portions, the only pressure acting upon the poured material after the molds are in fully assembled condition with the wire windings on the respective inner mold portions, will be the atmospheric pressure. This is highly important inasmuch as in this way the wire inserts once tightly wound around the inner mold portion are not subjected to any pressure which could possibly displace the wire inserts. Thus, once the wire inserts have been tightly wound around the respective inner mold portions or mandrel, they will safely stay in their respective position with the wire windings spaced in the desired manner, since during the solidification of the belt no pressure is exerted upon the poured material except atmospheric pressure. The proper location of the wire inserts is, therefore, assured and maintained and will be retained in the finished belt.

As a further advantage may be mentioned that since the mold walls are for all practical purposes exposed to atmospheric pressure only, the walls of the mold do not have to be very strong, so that the mold itself may be rather light.

While with the mold according to FIGS. 5, 8 and 9 the belt, after being withdrawn from the mold, has to be turned inside out, this is not necessary with a belt made by means of the mold of FIGS. 10 and 11. The belt withdrawn from the mold of FIGS. 10 and 11 is already in precisely the condition in which it will eventually be employed.

Figure 13:
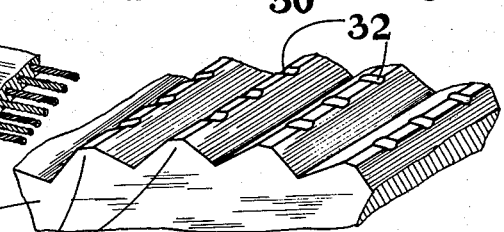
FIG. 13 shows a detail of a mold for use in connection with the present invention in order to facilitate the spaced winding of the reinforcement around the respective mold member.

In order to facilitate the spaced winding of the wire inserts around the inner mold member, the supporting means for supporting the wire windings, as for instance the elevations 11 or the pins 30, may be provided in a manner known per se with shallow transverse grooves 32 as shown for instance in FIG. 13 for the elevations 31 of FIG. 9.

It is, of course, to be understood that the present invention is, by no means, limited to the particular methods described in connection with the various embodiments shown in the drawings but also comprises any modifications within the scope of the appended claims. Thus, while in the drawings both the bottom surface of the inner mold portion and the upper surface of the bottom of the outer mold portion are inclined, it will suffice if the bottom of the inner mold portion only is inclined. Also the practicing of the method according to the invention is not limited to the molds described herein. Furthemrore, while in the drawings the windings of the reinforcing wire have been shown spaced from each other, it will be understood that the method of the invention may also be carried out with the windings of the wire arranged directly adjacent each other.

Obviously without unduly widening the scope of the invention, it is possible to replace the metal wires by threads of any other material such as textile material, plastic material, glass fibers etc. provided with similar mechanical properties. Consequently in the following claims, the word wire is to be understood as covering not only metallic wires, but also wires, cables, plaits, ribbons and the like made from every substance, either metallic or nonmetallic, substantially nonextensible.

What we claim is:

1. A method of making an endless flexible toothed precision belt my means of a first and a second mold member engageable with each other so as to confine therebetween an annular chamber corresponding in contour to the contour of the belt to be made, which includes the steps of: firmly spirally winding a wire insert around said first mold member while resting said wire insert on peripherally spaced portions only of said first mold member so that those wire insert portions which are not rested on said first mold member are spaced from the latter, pouring solidifiable synthetic material from which the belt is to be made into said second mold member, subsequently inserting said first mold member with the wire insert firmly connected thereto into said second mold member to thereby cause said first mold member to displace synthetic material from said second mold member into said annular chamber and to cause said synthetic material to flow around those wire insert portions which are not rested on said first mold member, allowing said synthetic material in said annular chamber to solidify while subjecting the solidifying synthetic material in said annular chamber to atmospheric pressure only, and subsequently separating said mold members and removing the cast belt therefrom.

2. A method of making an endless flexible toothed precision belt by means of an inner and outer mold member engageable with each other so as to confine therebetween an annular chamber corresponding in contour to the contour of the belt to be made, which includes the steps of: firmly spirally winding a wire insert around said inner mold member while resting said wire insert on peripherally spaced portions only of said inner mold member and while spacing the wire spirals spaced from each other in a direction substantially transverse to the winding direction of said wire insert, pouring solidifiable synthetic material from which the belt is to be made into said outer mold member, subsequently inserting the inner mold member with the wire insert firmly connected thereto into said outer mold member to thereby cause said inner mold member under its own weight only to displace synthetic material from said outer mold member into said annular chamber and to cause said synthetic material to flow around those wire insert portions which are not rested on said inner mold member, allowing said synthetic material in said annular chamber to solidify while subjecting the solidifying synthetic material in said annular chamber to solidify while subjecting the solidifying synthetic material in said annular chamber to atmospheric pressure only, and subsequently separating said mold members and removing the cast belt therefrom.

3. A method of making a belt of synthetic material by means of a mold having an outer mold member and an inner mold member engageable with each other so as to confine therebetween an annular chamber corresponding in contour to the contour of the belt to be made, which includes the steps of: spirally and firmly winding a reinforcing wire around said inner mold member while resting the windings of said wire at substantially evenly spaced points only of said inner mold member so as to leave intermediate portions of the windings non-engaged by said inner mold member, pouring castable synthetic material from which the belt is to be made into said outer mold member, inserting the inner mold member having the reinforcing wire thus wound around into the outer mold member to thereby cause said inner mold member under its own weight only to displace synthetic material from said outer mold member into said annular chamber and around said non-engaged wire portions, allowing said synthetic material in said annular chamber to solidify while maintaining said wire windings spaced from said outer mold member and while subjecting the solidfying synthetic material in said annular chamber to atmospheric pressure only, withdrawing said mold members from each other, and removing the cast belt therefrom.

4. A method of making a belt of synthetic material by means of a mold having an outer mold member with an inner contour corresponding to the teeth of the belt to be made and having an inner mold member engageable with the outer mold member and confining an annular chamber therewith, which includes the steps of: spirally and firmly winding a reinforcing wire around said inner mold member while resting each winding on said inner mold member along circumferentially substantially evenly spaced points only of said inner mold member thereby leaving intermediate portions of the windings non-engaged by said inner mold member, pouring castable synthetic material from which the belt is to be made into said outer mold member, inserting the inner mold member having the reinforcing wire thus wound around into the outer mold member while maintaining said wire windings spaced from said outer mold member to thereby cause said inner mold member under its own weight only to displace synthetic material from said outer mold member into said annular chamber while simultaneously causing said synthetic material to flow around said non-engaged portions, allowing said synthetic material in said annular chamber to solidify while subjecting the solidifying synthetic material in said annular chamber to atmospheric pressure only, withdrawing said mold members from each other, removing the cast belt therefrom, and turning the inside of the belt out.

5. A method of making a belt of synthetic material by means of a mold having an outer mold member with a cylindrical contour and having an inner mold member with a contour corresponding to the teeth of the belt to be made and confining with said outer mold member an annular chamber, which includes the steps of: spirally and firmly winding a reinforcing wire around the marginal portion of the inner mold member while supporting each winding on said inner mold member along circumferentially substantially evenly spaced points only of said inner mold member so as to leave intermediate portions of the wire windings in spaced relationship to said inner mold member, pouring castable synthetic material from which the belt is to be made into said outer mold member, inserting the inner mold member having the reinforcing wire thus wound around into the outer mold member while maintaining said wire windings spaced from said outer mold member to thereby cause said inner mold member under its own weight only to displace synthetic material from said outer mold member into said annular chamber while simultaneously causing said synthetic material to flow around said intermediate portions of said wire windings, allowing said synthetic material in said annular chamber to solidify while subjecting the solidifying synthetic material in said annular chamber to atmospheric pressure only, withdrawing said mold members from each other, and removing the cast belt therefrom.

References Cited in the file of this patent

UNITED STATES PATENTS

| Re. 18,433 | Barker | Apr. 19, 1932 |
| 1,195,118 | Weida | Aug. 15, 1916 |
| 1,630,874 | Tuska | May 31, 1927 |
| 1,898,031 | Carter | Feb. 21, 1933 |
| 1,914,487 | Carter | June 20, 1933 |
| 2,397,626 | Shriver | Apr. 2, 1942 |
| 2,507,852 | Case | May 16, 1950 |
| 2,642,920 | Simon et al. | June 23, 1953 |
| 2,963,743 | Kraft | Dec. 13, 1960 |

FOREIGN PATENTS

| 608,717 | Great Britain | Sept. 20, 1948 |
| 744,907 | Great Britain | Feb. 15, 1956 |
| 568,714 | Italy | Nov. 8, 1957 |